United States Patent Office 2,941,370
Patented June 21, 1960

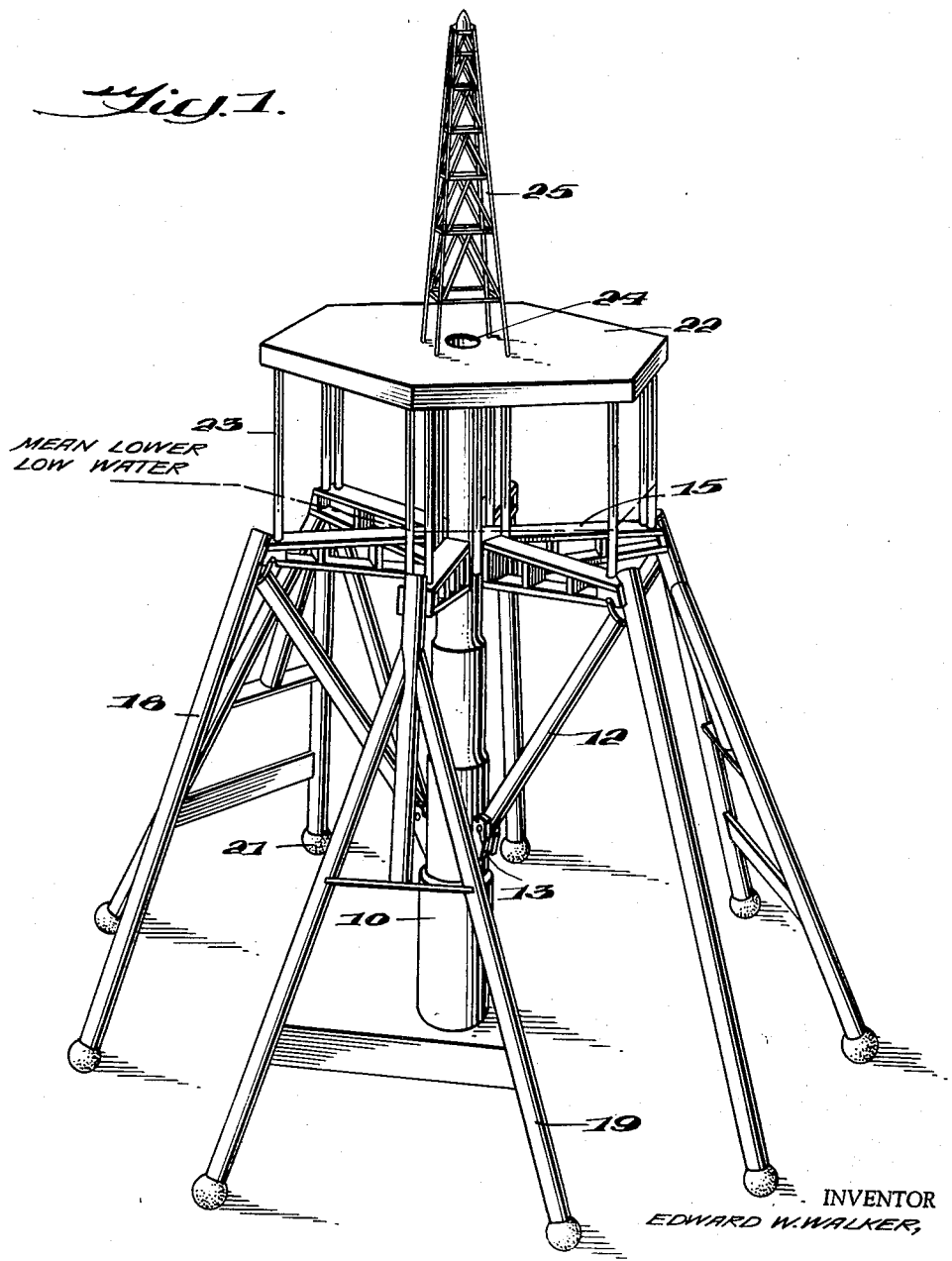

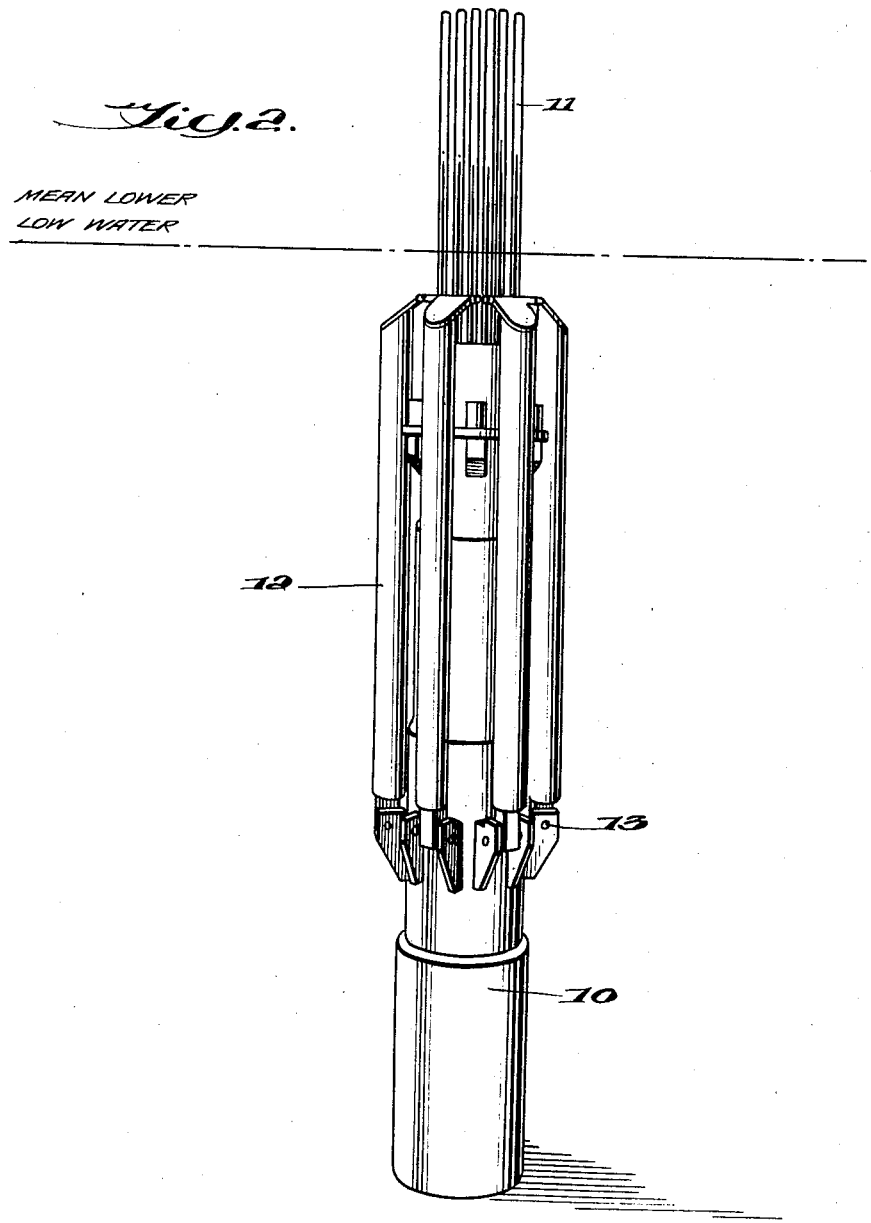

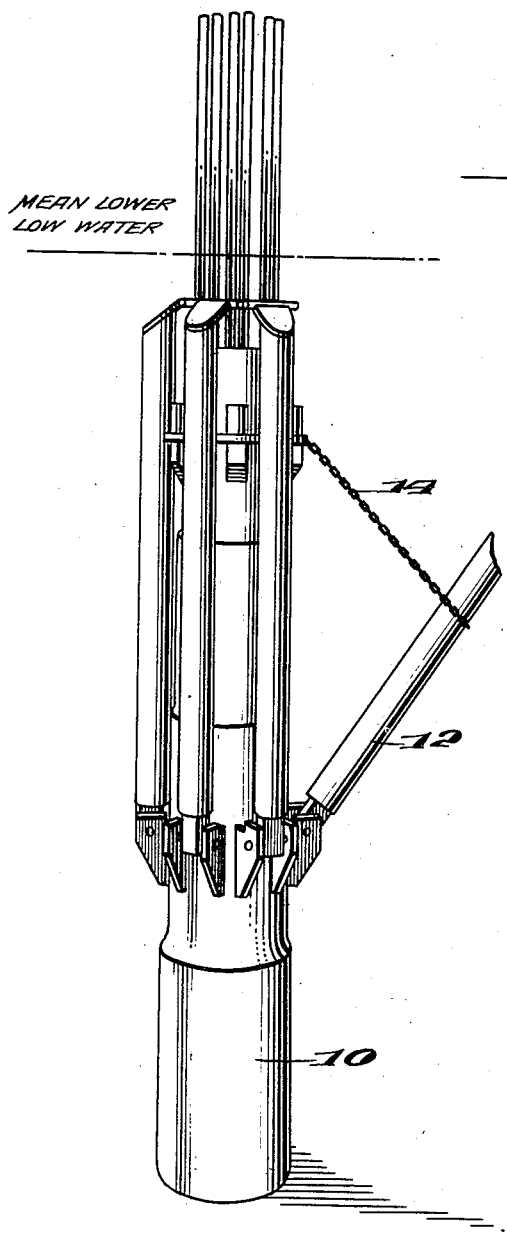
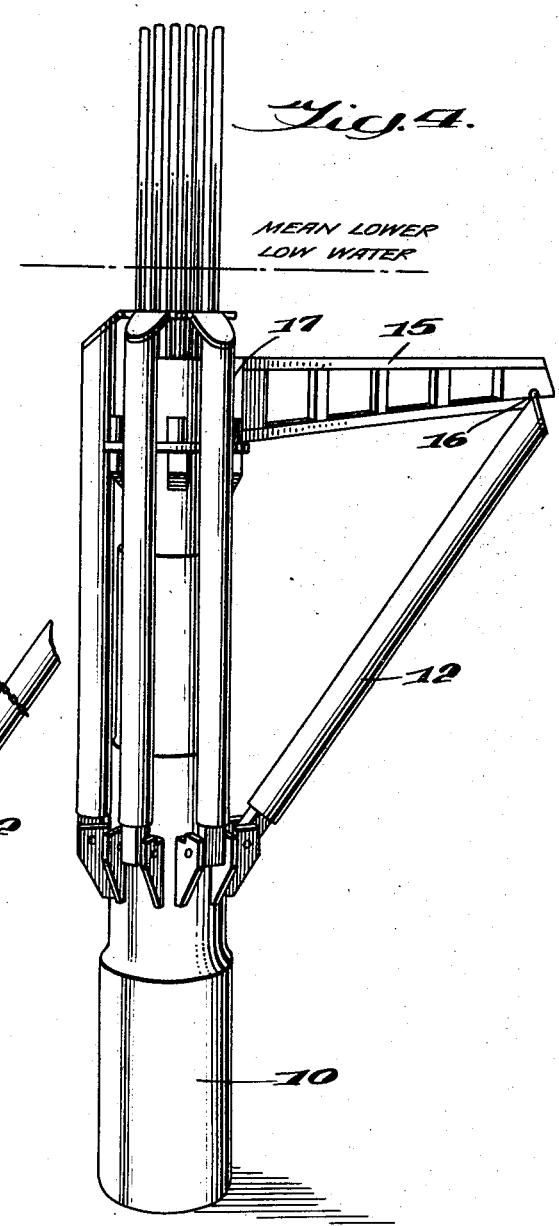

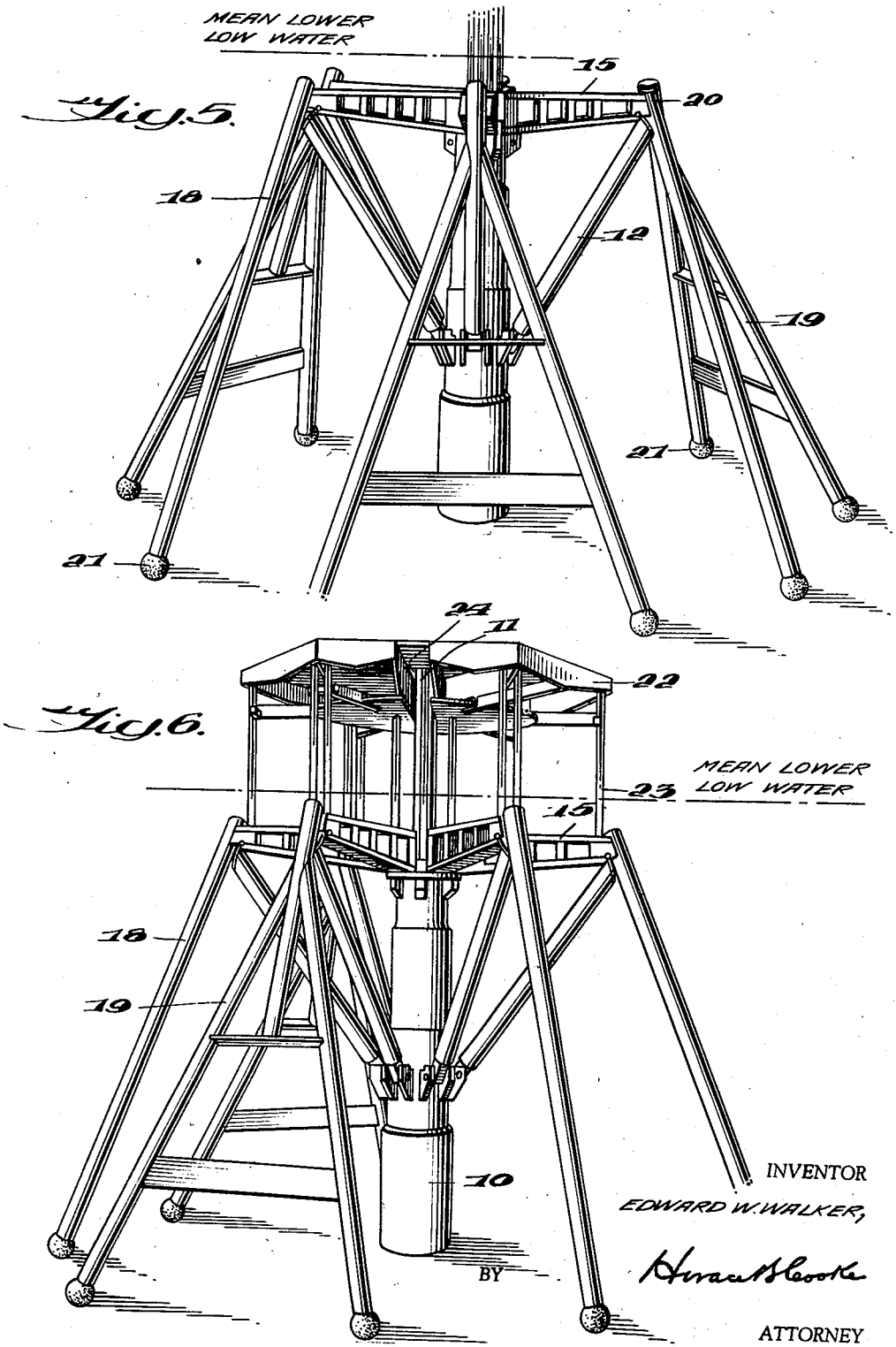

2,941,370

OFFSHORE PLATFORMS

Edward Wilfrid Walker, Los Angeles, Calif., assignor to Western Gulf Oil Company, Los Angeles, Calif., a corporation of Delaware Filed Jan. 19, 1956, Ser. No. 560,157

3 Claims. (Cl. 61—46.5)

This invention relates to offshore platforms and particularly to offshore platforms for drilling rigs, having a novel structural framework which allows maximum stability against wind and wave forces and permits maximum protection against the chemical and biological effects of sea water and marine life on the structure.

Offshore platforms employed to support facilities such as derricks for oil drilling at sea are subjected to the natural physical forces of wind and waves and, in addition, are subjected to the chemical and biological effects of sea water and marine life which in certain waters cause serious corrosion and fouling of the structural members of the supporting framework. Wind and waves exerting horizontal physical forces against the structure can result in instability and a danger of upset especially when a tall structure, as is necessitated by deep water drilling, is employed. To stabilize the platform and protect against the danger of upset, the peripheral structural members should be inclined outwardly in downward direction, thus providing a base covering a much larger area than the platform deck. Structures heretofore designed to provide such an enlarged base construction employ structural members which are inclined uniformly outward from the derrick platform to the ocean floor and, since the angle of their inclination is necessarily limited, the peripherial points of bearing on the ocean floor are located within an area which is not appreciably greater than that of the supported platform. Furthermore, such a construction, by permitting main structural members to project above the surface of the water, exposes relatively large surface areas to wind and wave forces in the zone where these forces are of greatest magnitude and, since most marine fouling and corrosion occurs in the first few feet below and above the water surface, serious problems arise by extending large main structural elements through this region. The improved offshore platform structure of this invention, which provides an enlarged base giving stability to the structure even at great depths, is designed to greatly reduce the effects of wind and waves and also to greatly diminish the problems of marine fouling and corrosion. These difficulties are circumvented by locating the larger main structural members below the surface of the water so that they are protected against the effects of surface or splash zone corrosion or marine fouling. Only round structural supporting members of decreased surface area project above the water level so that there is a minimum resistance to wind and wave forces. These members may be economically covered with stainless steel to protect against surface corrosion or marine fouling and, if necessary, may be replaced easily without disturbing the submerged main structural framework.

Consequently it is a principal object of this invention to provide an offshore drilling or working platform which is stabilized against upset by means of an improved wide base construction.

Another object is to reduce the effects of wind and wave forces by employing a structural design whereby the main foundation elements having the greatest surface areas, including all the members inclined outwardly toward the base, are submerged below the surface of the water, and to employ columns of decreased surface area for minimum resistance to wind and waves as the only structural supporting elements which project above the surface of the water.

Another object is to further alleviate the effects of wind and waves by constructing the above water drilling or working area deck in the shape of a hexagon in order to present more uniform exposure to winds and currents from any direction.

A further object is to protect against surface or splash zone corrosion and marine fouling by covering the deck supporting columns which project up through the surface of the water with stainless steel and to design the structure so that these elements may, if necessary, be readily removed without disturbing the submerged main foundation structure.

Another object is the protection of the foundation structural members themselves from electrolytic corrosion by the provision of cathodic protection against corrosion of these members which protection is made possible by the fact that these members are always completely submerged.

Another important object of this invention is the provision of a structure which may be assembled at sea with a minimum of crane work or which can be built ashore and floated to the site of operations.

Still another object is the provision of an offshore platform which is readily salvable or which may be permanent if desired.

Another principal object is the provision of a structure from which many wells may be drilled and which gives adequate support for casing conductors in deep water.

A further object is the provision of a structure readily adaptable to various depths of water, various bottom contours or shapes or various permissible soil loadings.

These and other objects and advantages of this invention will be apparent from the specification which follows with reference to the accompanying drawings in which:

Figure 1 shows the fully constructed offshore drilling platform of this invention.

Figures 2, 3, 4, 5 and 6 show in detail the component parts of the platform and their setwise integration into the completed structure.

Figure 2 shows the central caisson 10 which can be floated in horizontal position to the drilling area. By designing adequate buoyancy in the upper section of the caisson and using a concrete ballast to concentrate as much weight as possible in the extreme lower portion, the compartmented caisson may be selectively flooded and sunk in a vertical position at the drilling site as shown in Figure 2. The bottom of the caisson is equipped with a jetting system, not shown, for setting in firm, sandy ocean bottom. The caisson of the preferred embodiment of my invention has a 34 ft. diameter at the bottom, a 24 ft. diameter at the top and is adapted for 200 feet of water. Ten 30-inch diameter steel conductors 11, through which drilling operations are carried on, are welded to the inside circumference of the caisson. Six hollow steel supporting arms 12 are attached at their lower ends to equally spaced points on a circumference of the caisson by means of pins 13. The supporting arms 12 are nested closely against caisson 10 during both towing and setting operations, as shown in Figure 2. In this manner, a plurality of structural members are towed and sunk as a single, compact unit. The entire caisson and supporting arm assembly when erected are below the mean lower low water mark. The hollow supporting arms are moved outwardly by flooding and are temporarily restrained at the required angle by a suitable linkage or stop 14. Figure 3 shows one of the supporting arms in the extended position. The restraining linkage 14 is attached at the time the unit is constructed on shore. When all six supporting arms are flooded and extended, an inverted umbrella-like structure is formed. The supporting arms are secured in the extended position by means of six identical horizontal bracing units 15. These bracing units are preferably of the pontoon type. Figure 4 shows the use of one of the six identical pontoon bracing units employed in this structure. These bracing units are constructed of hollow steel for buoyancy and are floated into position and sunk into place. Each bracing unit engages pin connections 16 at the top end of each supporting arm and engages other connections 17 at the upper end of the caisson. To provide an enlarged base for the structure, supporting columns which incline outwardly in downward direction are used as shown in Figure 5. Three single columns 18 and three A frame columns 19 are used alternately as the inclined supporting columns for the structure, although either type of supporting column could be used alone. Both types of supporting columns are constructed of steel and are preferably hollow so that they may be floated horizontally, towed into position, sunk and jetted to a firm foundation and finally clamped securely into sockets 20 provided in the extreme ends of the pontoon bracing units 15. One end of each supporting column is sunk into the ocean floor while the other more buoyant end is swung inwardly and attached to a bracing unit. Instead of being attached to a bracing unit, each supporting column 18 or 19 may be attached directly to the upper end of each supporting arm 12. If desired, the supporting columns may be three legged members, some portions of each member being hollow to provide buoyancy. The connection of the supporting columns at the ends of supporting arms 12 forms an inverted-V structure one leg of which bears on the caisson and the other leg has bearing on the ocean floor. The lower ends of the supporting columns 18 and 19 terminate in spheres 21 so that bearing is maintained after tilting the supports into position. Jets may be provided around the spheres and along the lower end of the supporting columns to facilitate positioning while setting. The hollow steel used to construct both types of supporting columns is 8 ft. in diameter and the spheres at the ends of the columns are 12 ft. in diameter. The spheres at the base of each A frame type supporting column are separated by a distance of 100 ft. Spacing braces, not shown in the drawings, can be provided between the extremities of the bracing units 15. The structure assembled in Figure 5 is the main foundation structure of the platform. The inclined supporting columns providing a base of enlarged area provide support and also impart stability to the platform against forces from all directions and protect against the danger of upset. All the members of the foundation structure are submerged below the mean lower low water mark to prevent surface corrosion or marine fouling of these members. Being completely submerged, the entire foundation structure may be cathodically protected from electrolytic corrosion.

Figure 6 shows the elements of the structure which project above the surface of the water. After the central caisson 10 has been set and guyed, horizontal bracing units 15 and their spacing braces set, and supporting columns 18 and 19 secured, the deck 22 is floated into position over the caisson and above the bracing units. The deck may be floated as a completed unit or may be constructed in sections. Deck 22 is provided with a central slot 24 to clear conductor pipes 11. Steel pipe columns 23 are dropped through guides in the deck to engage receptacles in the horizontal bracing units 15. There are three receptacles provided in each bracing unit for these deck pipe columns, two receptacles are located near the outer end of each bracing unit and the third is located close to the central caisson. Pipe columns may be used in some or all of these receptacles. Hydraulic jacks or other suitable lifting means acting between deck 22 and pipe columns 23 raise the platform into final operating position at an elevation out of the reach of waves. The platform may be square shaped but is preferably shaped in the form of a hexagon. This shape approaches the maximum area in a given circumference and with this shape the platform presents uniform exposure to winds and currents from any direction. The pipe columns 23 are 4 ft. in diameter. While members which are not circular in cross section could be employed, the use of only circular members projecting above the surface of the water, which are small in relation to the submerged main foundation structural members, minimizes interference to wind and wave forces. If desired, these smaller columns may be easily and inexpensively protected against surface corrosion and marine fouling by means of a stainless steel sheathing and, if necessary, may be readily removed and replaced.

Figure 1 shows the completed structure with deck 22 being used as a support for derrick 25. The lower portion of the platform is above maximum wave height. The horizontal bracing units 15, caisson 10, supporting arms 12 and supporting columns 18 and 19, are submerged below the mean lower low water mark and, since they are submerged, can be cathodically protected from corrosion. Structural members 23 in the splash zone are cylindrical and have a smaller surface area than the submerged members and can be economically protected by a sheeting of stainless steel or other material. The conductor pipes terminate below the level of the platform and are adequately spaced for convenient working of well head equipment.

In the event of a dry hole and abandonment, surface pipe can be shot off below the bottom of the caisson and the entire unit dismantled and moved to a new location.

Various changes and modifications may be made without departing from the spirit of this invention as defined in the following claims.

I claim:

1. A stable offshore drilling or working platform comprising a hollow elongated central caisson secured into the ocean floor in vertical position, the interior of said caisson being compartmented for selective flooding to secure it vertically into place from a horizontal floating position, a plurality of supporting arms extending upwardly and outwardly from pivots at their lower ends arranged on a circumference of said central caisson, said supporting arms being hollow and adapted to be spread from a vertical nested position against said caisson by flooding, horizontal braces extending between the outstretched ends of said supporting arms and said caisson, said braces being hollow and adapted for flooding and sinking into positon, hollow supporting columns outwardly inclined from the outstretched ends of said supporting arms to the ocean floor, the point of contact between each of said supporting columns and supporting arms forming the apex of an inverted V-structure one leg of which bears on the central caisson and the other leg of which has footing on the ocean floor, vertical columns projecting above the surface of the water from the ends of said horizontal braces, and a deck supported upon said vertical columns above the surface of the water, said deck being free of contact with the central caisson whereby the entire deck load is distributed through the series of circumferential inverted V-structures in part to the footings on the ocean floor and in part to the central caisson.

2. A stable offshore drilling or working platform comprising a buoyant central caisson, said caisson having compartmented sections adapted to be selectively flooded in order to sink said caisson in a vertical position, a plurality of supporting arms pivotally secured to said caisson above its lower end and arranged in spaced relation circumferentially thereof, said supporting arms being hollow and adapted to extend upwardly and outwardly from their attachment to the caisson upon flooding when the caisson is disposed vertically in the ocean floor, hollow braces extending between and securing the outstretched ends of said arms to the caisson, said braces being adapted to be flooded and sunk into position and having attaching means on either end for attachment respectively to the central caisson and to the supporting arms, hollow supporting columns having means for attachment to the outstretched ends of said supporting arms and extending downwardly and outwardly from said arms to the ocean floor, the point of contact between each of said supporting columns and supporting arms forming the apex of an inverted V-structure one leg of which bears on the central caisson and the other leg of which has footing on the ocean floor, columns extending vertically upward from the ends of said braces and a deck adapted to be supported upon said columns at an elevation above high water, said deck being free of contact with the central caisson whereby the entire deck load is distributed through the series of circumferential inverted V-structures in part to the footings on the ocean floor and in part to the central caisson.

3. In the erection of an offshore drilling or working platform comprising a plurality of members pivotally attached to circumferentially spaced points at one end to an elongated buoyant caisson, the method comprising swinging the free ends of the pivotally attached members toward said caisson and compactly nesting said members lengthwise against said caisson to form a compact buoyant unit, floating said unit to the offshore drilling site, sinking the caisson in vertical position and securing the bottom end thereof securely in the ocean floor, swinging said pivotally attached members outwardly from their nested position, restraining said outward movement at the desired angle and forming an inverted umbrella-like structure, securing a horizontal brace between the extended end of each pivotally attached member and said caisson, floating supporting columns into position and sinking one end of each of said supporting columns to bottom and swinging the other end of each of said supporting columns inwardly to the outstretched end of each of said pivotally attached members, clamping the outstretched end of each of said pivotally attached members to the upper end of each of said supporting columns, erecting vertical columns from the ends of said horizontal braces, floating a platform into position and raising said platform on said vertical columns.

References Cited in the file of this patent

UNITED STATES PATENTS

| | | |
|---|---|---|
| 937,612 | Kircher | Oct. 19, 1909 |
| 1,094,033 | Stone | Apr. 21, 1914 |
| 1,868,494 | Collins | July 26, 1932 |
| 2,077,044 | Grace et al. | Apr. 13, 1937 |
| 2,187,871 | Voorhees | Jan. 23, 1940 |
| 2,416,848 | Rothery | Mar. 4, 1947 |
| 2,579,703 | Rutledge et al. | Dec. 25, 1951 |
| 2,600,761 | Halliburton | June 17, 1952 |
| 2,637,978 | Evans et al. | May 12, 1953 |
| 2,772,539 | Sandberg | Dec. 4, 1956 |
| 2,775,095 | Harris | Dec. 25, 1956 |
| 2,777,669 | Willis et al. | Jan. 15, 1957 |